United States Patent
Dubal et al.

(10) Patent No.: US 9,537,979 B2
(45) Date of Patent: Jan. 3, 2017

(54) NETWORK ADAPTER OPTICAL ALERT SYSTEM

(71) Applicant: Intel Corporation, Santa Clara, CA (US)

(72) Inventors: Scott P. Dubal, Beaverton, OR (US); Patrick Connor, Beaverton, OR (US); Chris Pavlas, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 84 days.

(21) Appl. No.: 14/568,789

(22) Filed: Dec. 12, 2014

(65) Prior Publication Data
US 2016/0173351 A1    Jun. 16, 2016

(51) Int. Cl.
   *H04L 29/06*   (2006.01)
   *H04L 12/24*   (2006.01)

(52) U.S. Cl.
   CPC .............. *H04L 69/16* (2013.01); *H04L 41/04* (2013.01); *H04L 41/06* (2013.01)

(58) Field of Classification Search
   CPC .......... H04L 69/16; H04L 41/04; H04L 41/06
   See application file for complete search history.

(56) References Cited

U.S. PATENT DOCUMENTS

| | | | | |
|---|---|---|---|---|
| 2003/0007215 A1* | 1/2003 | Snawerdt | ............. | H04B 10/071 398/139 |
| 2004/0034732 A1* | 2/2004 | Valin | ............. | G11C 11/406 711/4 |
| 2004/0208632 A1* | 10/2004 | Dietz | ............. | G09G 3/3406 398/182 |
| 2006/0294095 A1* | 12/2006 | Berk | ............. | G06Q 10/04 |
| 2008/0319282 A1* | 12/2008 | Tran | ............. | A61B 5/103 600/301 |
| 2012/0265865 A1* | 10/2012 | Tanaka | ............. | H04L 41/044 709/223 |
| 2013/0156419 A1* | 6/2013 | Hino | ............. | B66F 9/07 398/25 |
| 2013/0266325 A1 | 10/2013 | Giustiniano et al. | | |

OTHER PUBLICATIONS

Giustiniano, Domenico, et al, "Low-Complexity Visible Light Networking with LED-to-LED Communication," Disney Research, IEEE, 2012, 8 pages, Zurich, Switzerland.

Dietz, Paul, et al., "Very Low-Cost Sensing and Communication Using Bidirectional LEDs," UbiComp 2003, Jul. 2003, 19 pages, TR2003-35, Mitsubishi Electric Research Laboratories, Seattle, Washington.

* cited by examiner

*Primary Examiner* — Ajay Cattungal
(74) *Attorney, Agent, or Firm* — Grossman, Tucker, Perreault & Pfleger, PLLC

(57) ABSTRACT

One embodiment provides a network adapter. The network adapter includes a network adapter controller, a medium access controller (MAC) and a physical layer (PHY) including at least one port. The network adapter further includes optical communication logic to at least one of receive and/or acquire a local alert and generate a local alert message related to the local alert, the local alert message including an alert identifier (ID) and a network adapter ID. The network adapter further includes a first light emitting diode (LED) to convert the local alert message to a corresponding optical local alert message and to transmit the optical local alert message to an optical communication path.

24 Claims, 4 Drawing Sheets

NETWORK ADAPTER OPTICAL ALERT SYSTEM

FIELD

The present disclosure relates to optical alerts, in particular to, a network adapter optical alert system.

BACKGROUND

In some applications, e.g., data centers, a number of computing systems may be grouped together in proximity to one another. Operation of the computing systems may be monitored by a system administrator using another computing system, e.g., a system management device. The system management device may be coupled to the computing systems by communication links and/or a network.

The system administrator, using the system management device, may monitor operation of the computing systems in order to detect and respond to any faults. Fault alerts may be transmitted from the computing systems to the system management device via the communication links and/or the network. A fault that affects a communication link may prevent transmission of the fault alert(s) to the system management device and, thus, the system administrator.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
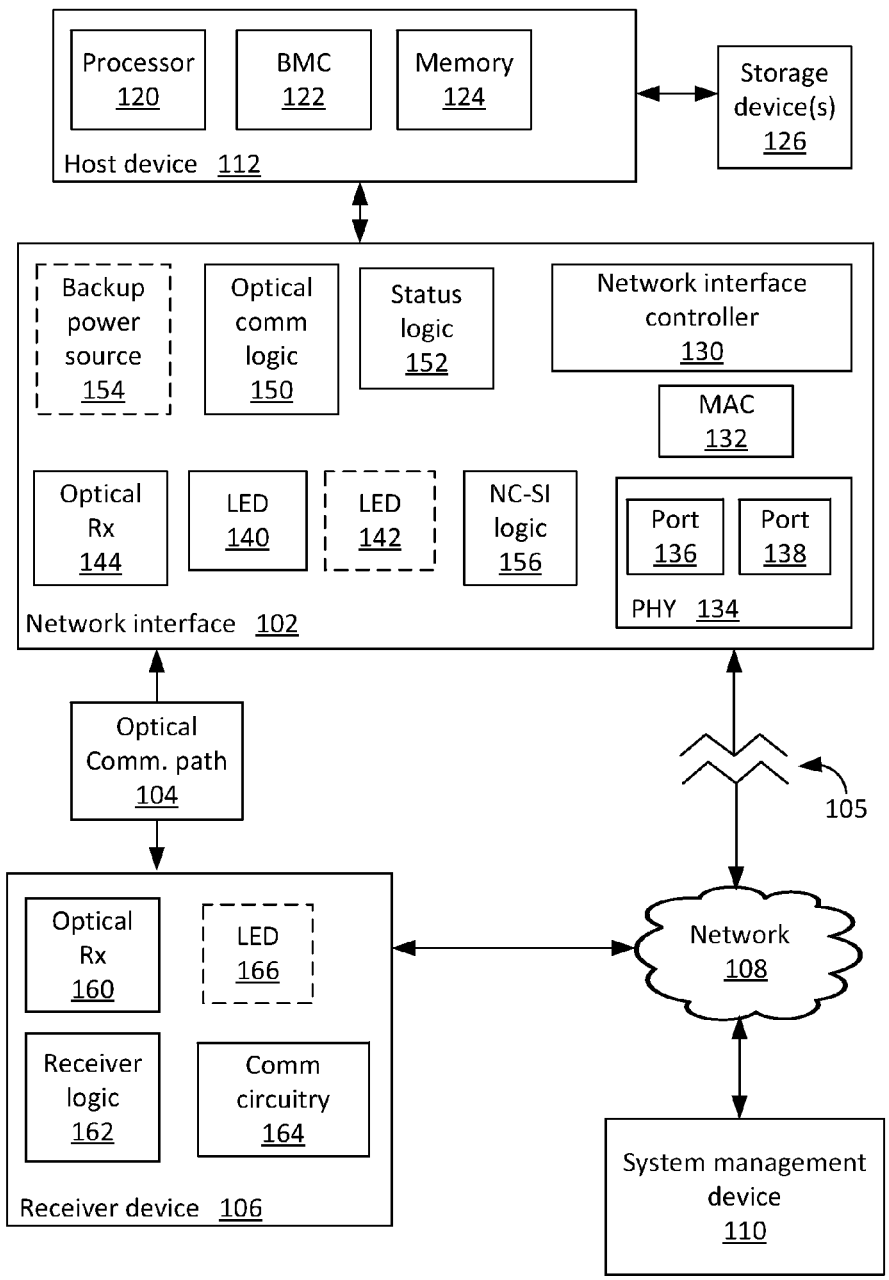
FIG. 1 illustrates a functional block diagram of a network adapter optical alert system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to network adapter optical alert methods (and systems). The methods and systems are configured to communicate fault-related alerts using one or more light emitting diode(s) (LED(s)) present on network adapters. The methods and systems are configured to facilitate transmission of one or more alert(s) from a network adapter that has received and/or acquired the alert(s) to a system management device via an optical communication path if a communication link, e.g., Ethernet connection, is not operational. The optical communication path is configured to couple the network adapter to a receiver device that has an operational communication link to the system management device.

A network adapter, consistent with the present disclosure, is configured to receive and/or acquire an alert and to generate an alert message related to the alert. The alert message may include an alert identifier and/or a network adapter identifier. The optical alert message may be transmitted to an optical communication path. The optical alert message may be transmitted by modulating a light (i.e., optical energy) output of one or more LED(s) present on the network adapter.

The optical communication path is configured to carry the optical alert message to the receiver device. The optical communication path may include one or more of an optical transmission medium (e.g., air), one or more other network adapter(s) and/or an optical fiber. In some embodiments, the optical communication path may further include a mirror.

The receiver device is then configured to transmit the alert message to the system management device via a communication link that is operational and so provides connectivity between the receiver device and the system management device. The receiver device may correspond to another network adapter and/or be included in a chassis for, e.g., rack-mounted network adapters.

Each network adapter and each receiver device may be configured to receive an optical alert message, convert the optical alert message to a corresponding electrical alert message, decode the electrical alert message and transmit a corresponding electrical and/or optical alert message. For example, each network adapter and/or receiver device may include a photosensor, photodetector (e.g., photoconductor, photodiode), camera, another LED, etc., configured to receive and convert the optical alert message from optical to electrical. Photodiodes include junction photodiodes (e.g., Schottky diode, PIN (p-type, intrinsic region, n-type) diode, MSM (metal-semiconductor-metal) diode) and avalanche photodiodes.

Thus, a network adapter that may have lost connectivity with a system management device (i.e., that has a non-operational communication link) may communicate alert(s) using LED(s) present on the network adapter.

FIG. 1 illustrates a system block diagram of a network adapter optical alert system 100 consistent with several embodiments of the present disclosure. System 100 includes a network adapter 102, an optical communication path 104, a receiver device 106, network 108, a system management device 110 and a host device 112. Network adapter 102 is configured to couple host device 112 to network 108 and may be configured to support both in-band and out-of-band (OOB) communication, as described herein. For example, OOB communication may be configured to communicate alert(s) from host device 112 to system management device 110 and to receive commands from system management device 100 when host device 112 may not be fully operational. OOB communication may allow remote control of the host device 112 by the system management device 110. Network adapter 102 may be configured to couple to network 108 via communication link 105 for both in-band and OOB communication. Communication link 105 may or may not be operational. When communication link 105 is not operational, network adapter 102 may be unable to connect to network 108.

Host device 112 includes a processor 120, a baseboard management controller (BMC) 112 and memory 124. Host device 112 may be coupled to one or more storage device(s) 126. Storage device(s) 126 may include disk drive(s), solid-state storage device(s), RAID (redundant array of independent disks), etc. Processor 120 is configured to perform operations of host device 112. BMC 122 is configured to monitor a physical state of host device 112 and to communicate the physical state to system management device 110 via network adapter 102, communication link 105 and network 108. BMC 122 may comply or be compatible with an Intelligent Platform Management Interface (IPMI), as described herein. Physical state parameters include temperature(s), humidity, power-supply voltage(s), power loss, fan speed(s), thermal event(s), fan failure, communications parameters (e.g., link failure), operating system (OS) functions, timeout events (e.g., locked state machine(s)), system physical security, etc. BMC 122 is configured to send an alert to system management device 110 via network adapter 102 using, for example, OOB communication, if one or more physical state parameter(s) is outside of preset limit(s). Physical state parameter(s) outside of respective preset limit(s) may indicate that a failure of host device 112 is possible, is imminent or has occurred.

Network adapter 102 includes a network adapter controller 130, a media access controller (MAC) 132, a physical layer circuitry (PHY) 134 that includes one or more port(s) 136, 138. Network adapter controller 130 is configured to manage the operations of network adapter 102. MAC 132 and PHY 134 are configured to provide connectivity to network 108 and may be configured to operate according to one or more communication protocol(s), e.g., Ethernet.

Network adapter 102 includes a first LED 140 and may include a second LED 142. Network adapter 102 includes an optical receiver 144. The LED(s) 140, 142 may typically be configured to indicate link speed (e.g., data rate), link status and/or error status of MAC 132 and/or PHY 134. In an embodiment, one or more of LED(s) 140, 142 may be configured to transmit an optical alert message and/or an optical acknowledgement (ACK), as described herein. Optical receiver 144 is configured to receive an optical alert message and/or an optical ACK. In an embodiment, optical receiver 144 may correspond to LED 140 or LED 142. The optical alert message(s) and optical ACK(s) may be transmitted to and/or received from optical communication path 104.

Network adapter 102 includes optical communication logic 150 and status logic 152 and may include backup power source 154 and/or Network Controller Sideband Interface (NC-SI) logic 156. Status logic 152 is configured to monitor a status of network adapter 102. For example, status logic 152 may monitor operations of MAC 132 and/or PHY 134 and operation of communication link 105. Status logic 152 may thus be configured to determine whether communication link 105 is operational. Status logic 152 may be further configured to notify optical communication logic 150 if communication link 105 is not operational. Status logic 152 may be further configured to monitor system power supplied to network adapter 102 in order to detect power fluctuation and/or power loss. In some embodiments, status logic 152 may be configured to monitor operation of network adapter controller 130 to, for example, detect a time out event. In some embodiments, status logic 152 may be configured to notify optical communication logic 150 if connectivity is lost, e.g., network adapter controller 130, MAC 132, PHY 134 and/or communication link 105 are not operational.

Backup power source 154 is configured to provide operational power to network adapter 102 for a limited time if system power normally supplied to network adapter 102 is lost (i.e., fails). For example, backup power source 154 may include a capacitor charged by a system power supply. The capacitor capacitance may be selected to provide power to the network adapter 102 for a pre-defined time period. In another example, backup power source 154 may include a battery. System power may normally be supplied by, for example, host device 112 and/or a chassis for a blade-type host device Such backup power may be used by network adapter 102 to support communicating an alert to, e.g., system management device 110 related to the power loss. Such alert may be communicated optically, as described herein.

NC-SI logic 156 is configured to provide an OOB interface between network adapter 102 and BMC 122. NC-SI logic 156 may comply or be compatible with an IPMI specification, as described herein. NC-SI logic 156 may be configured to provide host device 112 status data from BMC 122 to, for example, system management device 110.

Optical communication logic 150 is configured to receive local alert identifier(s) (ID(s)) from status logic 152 and/or NC-SI logic 156. Optical communication logic 150 may be configured to receive a connectivity status from status logic 152. Such connectivity status may be related to whether (or not) communication link 105 is operational. The alert ID(s) are related to a state of host device 112 and/or network adapter 102. Optical communication logic 150 is further configured to generate an alert message that includes the local alert ID(s) and a network adapter ID. For example, the network adapter ID may correspond to a MAC address and/or an IP (Internet Protocol) address associated with the network adapter 102. In another example, the network adapter ID may be related to a location of the network adapter 102 of a plurality of network adapters included, for example, in a data center. The plurality of network adapters and a plurality of host devices, e.g., host device 112, may be arranged in one or more rack(s) that may be arranged in, for example, one or more row(s). In this example, the network adapter ID may include a row number and/or rack number that correspond to a location within the data center. The network adapter ID may further include a network adapter number within a rack.

Optical communication logic 150 is further configured to control, e.g., current input to e.g., LED 140 to modulate the optical output of LED 140 to transmit a corresponding optical alert message to optical communication path 104. For example, the optical output of LED 140 may be modulated using on/off keying for optical alert messages. In on/off keying modulation, the LED 140 may be configured to emit optical energy for a first time interval and to not emit for a second time interval. For example, emitting optical energy for the first time interval may correspond to a binary one and not emitting light for the second time interval may correspond to a binary zero. Of course, in other embodiments, other modulation techniques may be used to modulate the output of LED 140 to produce an optical alert message related to the local alert. In some embodiments, the optical alert message may comply and/or be compatible with one or more communication protocol(s), including, but not limited to, TCP/IP (Transmission Control Protocol/Internet Protocol), UDP (User Datagram Protocol). In some embodiments, the optical alert message may correspond to a user-defined format. The user-defined format may generally be relatively simpler than TCP/IP and/or UDP but may also provide relatively less control information.

TCP/IP is a connection-oriented protocol, thus, a connection may be established between network adapter 102 and optical communication path 104 and/or receiver device 106. Optical communication logic 150 may be configured to establish a connection between network adapter 102 and optical communication path 104 and/or receiver device 106. For example, the connection may be established between the network adapter 102 and another network adapter included in the optical communication path 104. In another example, the connection may be established between the network adapter 102 and receiver device 106. The connection may be established by a hand-shaking process that includes transmitting and/or receiving synchronization (SYN) and ACK packets. Each TCP/IP packet may include a header that includes control information related to a source, a destination, a packet sequence ID, checksum, etc., and may include a payload that includes the alert ID(s) and the network adapter ID. TCP/IP may be further configured to provide resend of lost packets to provide in-order reception of transmitted packets. Thus, optical communication logic 150 may be configured to resend an alert message if an ACK is not received in a time interval.

UDP is connectionless, thus, a connection is not established and packets (e.g., alert messages) may be sent at any time. UDP packets may also include a header that includes control information related to a source, a destination, etc., and may include a payload that includes the alert ID(s) and the network adapter ID. UDP typically does not provide resend of lost packets. An application configured to communicate using UDP may be configured to provide at least some of such functionality. For example, optical communication logic 150 may be configured to resend an alert message if an ACK is not received in a time interval.

A user-defined, relatively simple format may be configured to communicate a relatively small amount of information. For example, an alert message that corresponds to a user-defined format may include a network adapter ID and an alert ID. An optical alert message corresponding to the user-defined format may be utilized, for example, in response to a loss of system power and/or a timeout event in host device 112 and/or network adapter controller 130 that has not resolved. The alert ID may then correspond to an SOS and optical communication logic 150 may be configured to drive LED 140 to repeatedly transmit the SOS and network adapter ID at a time interval without checking for an ACK.

Optical alert messages that are configured to be acknowledged and to be resent if not acknowledged in a time interval may reduce a number of optical alert messages transmitted compared to repeatedly transmitting a same optical alert message. The control information associated with acknowledging receipt may result in relatively more complex alert messages and relatively more processing. Whether a communication protocol such as TCP/IP or UDP or a user-defined format is used for the optical alert message may be related to, e.g., complexity of network adapter 102 and/or type of alert.

Thus, optical communication logic 150 may receive and/or acquire a local alert, may be configured to generate an alert message related to the local alert. Optical communication logic 150 may be further configured to control an input to LED 140 to modulate the light output (i.e., optical emission) of LED 140. LED 140 may thus transmit a corresponding optical alert message to optical communication path 104.

Optical receiver 144 is configured to receive remote optical alert message(s) and/or optical ACK(s) from optical communication path 104 and to convert the received optical alert message(s) and/or optical ACK(s) to corresponding electrical alert message(s) and/or ACK(s). For example, the remote optical alert message(s) may be received from another network adapter, as described herein. Optical receiver 144 is configured to capture incident optical energy and to generate an electrical output related to the captured incident optical energy. For example, optical receiver 144 may include a photosensor, photodetector (e.g., photoconductor, photodiode). Photodiodes include junction photodiodes (e.g., Schottky diodes, PIN diodes, MSM diodes) and avalanche photodiodes. In another example, optical receiver 144 may correspond to an image sensor such as a charge-coupled device (CCD) or CMOS sensor.

In another example, optical receiver 144 may include an LED, e.g., LED 140 or LED 142. An LED may be used to convert received optical energy to a corresponding electrical output. An LED may produce a relatively smaller electrical output (e.g., current) than, for example, a photodiode for a same received optical energy. Thus, circuitry associated with capturing the electrical output may be relatively more complicated. An LED used as an optical receiver may detect wavelengths of light greater than emission wavelengths of the LED. Thus, an LED as optical receiver may be relatively more limited regarding wavelength but may also reject ambient light. A benefit of using an LED as an optical receiver is that an existing LED on the network adapter 102 may be utilized thereby avoiding adding components.

In some embodiments, optical communication logic 150 is configured to receive electrical alert message(s) and/or electrical ACK(s) from optical receiver 144. For example, optical receiver 144 may receive an electrical remote alert message from LED 142. Optical communication logic 150 is configured to decode each alert message and/or ACK to determine whether network adapter 102 is a destination. If network adapter 102 is not the destination, then optical communication logic 150 may be configured to control LED 140 and/or LED 142 to transmit an optical remote alert message and/or ACK to forward the remote alert message and/or ACK. For example, optical communication path 104 may include another network adapter, as described herein. In another example, network adapter 102 may be included in an optical communication path of another network adapter. Thus, LED(s) 140 and/or 142 may be configured to transmit and/or receive optical alert messages and/or optical ACK(s).

Optical communication path 104 is configured to carry optical alert message(s) and/or optical ACK(s) to and/or from network adapter 102. Optical communication path 104 may include an optical transmission medium such as air, one or more other network adapter(s) and/or an optical fiber. Optical communication path 104 may further include a mirror. Other network adapter(s) may be configured to relay (i.e., receive and forward) optical alert message(s) and/or ACK(s) from/to network adapter 102.

Optical communication path 104 is configured to capture optical emissions (i.e., optical energy at one or more wavelength(s)). LED(s) 140, 142 may be configured to emit optical energy at one or more wavelength(s) in a visible spectrum (e.g., 400 nanometers (nm) to 700 nm). The optical energy may be emitted in an emission volume that may be bounded by network adapter 102. Dimensions (e.g., size and shape) of the emission volume may be related to physical position and/or orientation of the LEDs 140, 142 on network adapter 102 as well as position and/or orientation of network adapter 102 relative to mounting structure(s) and/or obstructions, if any.

Element(s) of optical communication path 104 and/or receiver device 106 may be positioned and/or oriented relative to network adapter 102 and LED 140, 142 so that an acceptance angle of a receiving element is within the emission volume of LED 140, 142. Incident rays from, e.g., LED 140, that are within the acceptance angle may be received and incident rays that are outside the acceptance angle may be reflected. The acceptance angle is typically measured relative to a perpendicular to a surface of a receiving element. An acceptance cone may be defined by an acceptance angle with an angle of the cone twice the acceptance angle. For example, optical communication path 104 may include a mirror configured to reflect received optical energy if the acceptance angle of a next receiving element is not within the emission volume of LED 140, 142 and/or an adjacent upstream transmitting element. As used herein, a transmitting element corresponds to an LED and/or a first end of an optical fiber and a receiving element corresponds to an optical receiver and/or a second end of the optical fiber. Optical communication path 104 may thus be configured to receive optical emissions from LED 140 or 142, to carry related optical alert message(s) and/or ACK(s) and to emit related optical energy for capture by receiver device 106. Element(s) of optical communication path 104 may thus be positioned and/or oriented to facilitate capture of emitted optical energy, transmission along the optical communication path 104 and reception by receiver device 106.

Receiver device 106 is configured to couple optical communication path 104 (and thereby network adapter 102) to network 108 and ultimately system management device 110. In an embodiment, receiver device 106 may correspond to another network adapter that has an operational communication link. Receiver device 106 includes optical receiver 160, receiver logic 162 and communication circuitry 164. Receiver device 106 may include an LED 166. In some embodiments, receiver device 106 may be directly coupled to system management device 110.

Optical receiver 160 is configured to receive optical alert message(s) from optical communication path 104. For example, the optical alert message may originate from network adapter 102. In another example, additional optical alert message(s) may be generated by one or more element(s) of optical communication path 104. In this example, the element(s) of optical communication path 104 may correspond to other network adapter(s). Optical receiver 160 is configured to convert received optical alert message(s) into corresponding electrical alert message(s). LED 166 is configured to convert electrical ACK(s) and/or message(s) into corresponding optical ACK(s) and/or message(s). LED 166 is configured to transmit optical ACK(s) to optical communication path 104. For example, the ACK(s) may be related to information received by receiver device 106 from system management device 110 via network 108.

Communication circuitry 164 is configured to transmit electrical alert message(s) to system management device 110 via network 108 and to receive electrical ACK(s) from system management device 110. Communication circuitry 164 may be configured to communicate using one or more communication protocol(s), as described herein.

Receiver logic 162 is configured to receive electrical alert message(s) from optical receiver 160 and ACK(s) from communication circuitry 164. Receiver logic 162 is configured to translate received alert message(s) and/or ACK(s) to a respective communication protocol compatible with optical communication path 104 and/or network 108.

Thus, network adapter 102 is configured to receive and/or acquire alert(s) related to a physical status of host device 112, network adapter 102 and/or communication link 105 and to generate and transmit an optical alert message to receiver device 106 via optical communication path 104, e.g., when communication link 105 is not operational. Receiver device 106 may then forward a corresponding alert message to system management device 110 and/or an ACK to optical communication path 104.

Figure 2:
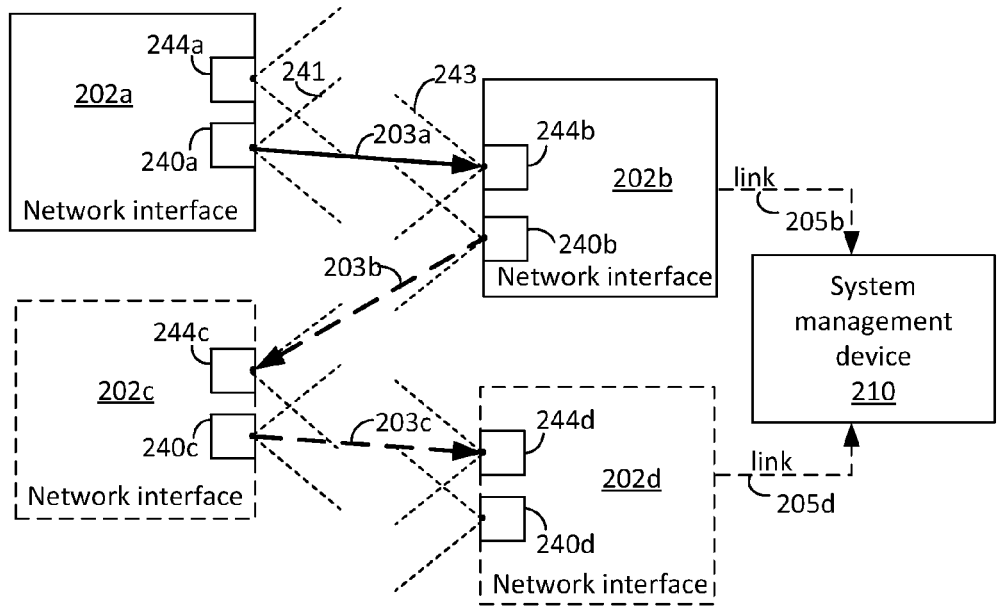
FIG. 2 illustrates an example network adapter optical alert system, this example including a communication path that includes at least one network adapter and a receiver device that corresponds to another network adapter, consistent with an embodiment of the present disclosure.
Figure 3:
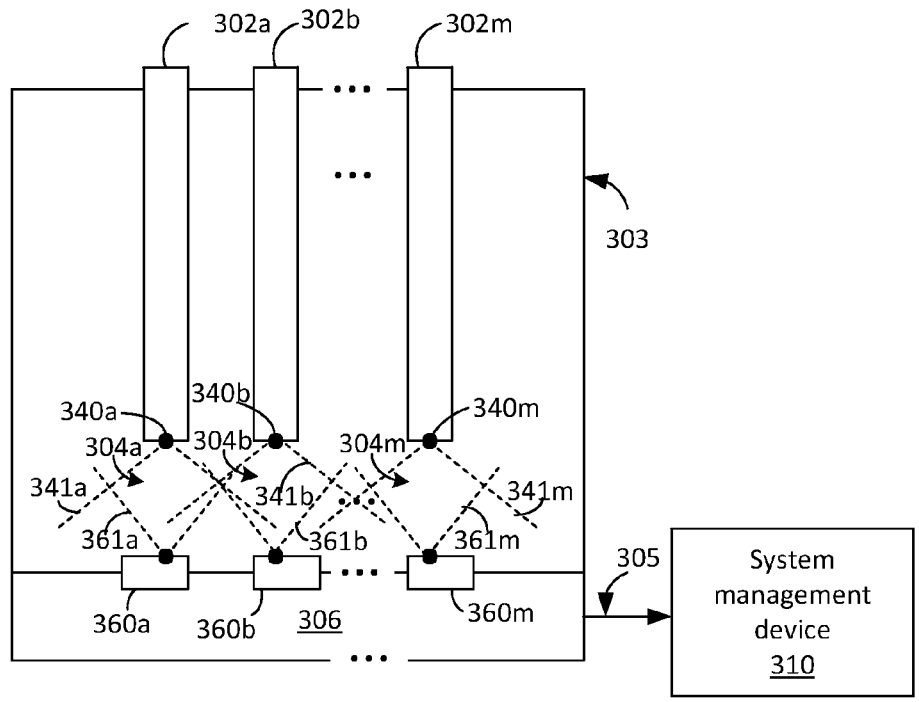
FIG. 3 illustrates another example network adapter optical alert system, this example including a plurality of network adapters in a rack and a receiver device included in a chassis, consistent with one embodiment of the present disclosure.
Figure 4:
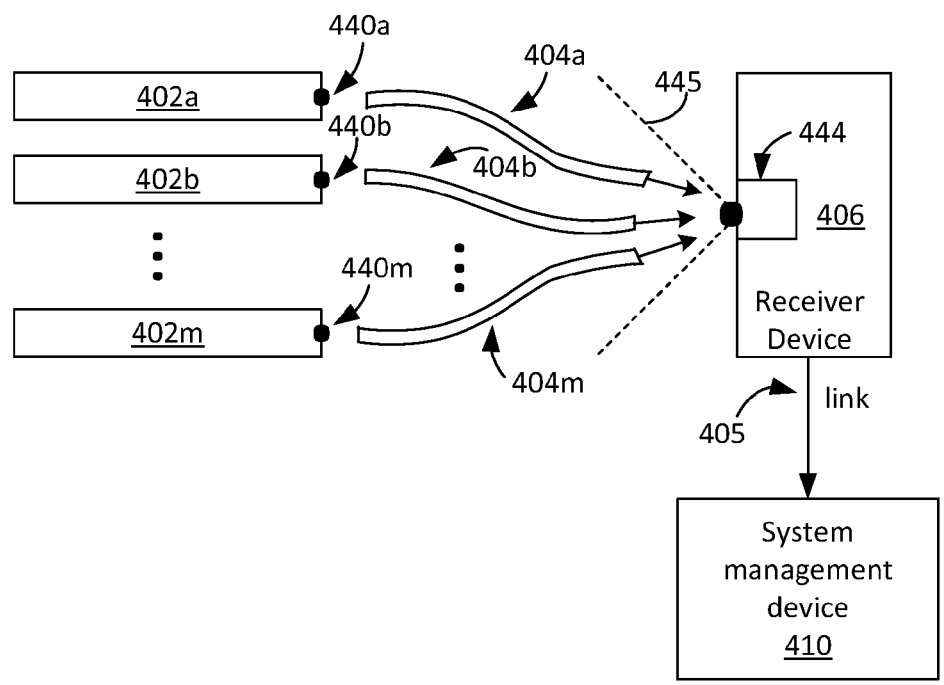
FIG. 4 illustrates another example network adapter optical alert system, this example including a communication path that includes an optical fiber, consistent with one embodiment of the present disclosure.

FIGS. 2 through 4 are example network adapter optical alert systems, consistent with various embodiments of the present disclosure. The examples of FIGS. 2 through 4 are configured to illustrate some configurations of optical communication path 104 relative to, e.g., network adapter 102 and receiver device 106. The examples of FIGS. 2 through 4 are meant to non-limiting.

FIG. 2 illustrates an example network adapter optical alert system 200 consistent with an embodiment of the present disclosure. Example network adapter optical alert system 200 illustrates two possible configurations of a network adapter optical alert system, consistent with the present disclosure. Example network adapter optical alert system 200 includes a plurality of network adapters 202a, . . . , 202d. Each network adapter 202a, . . . , 202d is an example of network adapter 102 of FIG. 1. Each network adapter 202a, . . . , 202d includes a respective LED 240a, . . . , 240d and a respective optical receiver 244a, . . . , 244d.

A first configuration represents a situation where a first network adapter 202a does not have connectivity to system management device 210 and a second network adapter 202b has connectivity to system management device 201 via link 205b. In this first configuration, second network adapter 202b corresponds to a receiver device, e.g., receiver device 106 of FIG. 1. System management device 210 corresponds to system management device 110 of FIG. 1. First network adapter 202a is optically coupled to second network adapter 202b by optical communication path 203a. Optical communication path 203a may thus include air. First network adapter 202a is configured to transmit an optical alert message via LED 240a to optical communication path 203a. Optical communication path 203a is configured to carry the optical alert message and provide the optical alert message to second network adapter 202b. Second network adapter 202b is configured to receive the optical alert message at optical receiver 244b, to convert the received optical alert message to a corresponding electrical alert message and to transmit the electrical alert message to system management device 210 via communication link 205b. Thus, an acceptance angle 243 and associated acceptance cone of optical receiver 244b is within an emission volume 241 of LED 240a.

A second configuration represents a situation where the first, second and third network adapters 202a, 202b, 202c do not have connectivity to the system management device 210. In other words, at least communication link 205b is not operational. A fourth network adapter 202d has connectivity to system management device 210 via communication link 205d. In this second configuration, fourth network adapter 202d corresponds to a receiver device, e.g., receiver device 106 of FIG. 1. First network adapter 202a is optically coupled to fourth network adapter 202d by an optical communication path that includes optical path portion 203a, second network adapter 202b, optical path portion 203b, third network adapter 202c and optical path portion 203c.

Thus, in this second configuration, the optical communication path includes air (e.g., optical path portions 203a, 203b, 203c) and two network adapters 202b, 202c. Each optical path portion 203a, 203b, 203c is configured to be within a respective emission volume of a respective transmitting element and each optical path portion 203a, 203b, 203c is configured to be within a respective acceptance angle (if any) of a respective optical receiver 244b, 244c, 244d. The second and third network adapters 203b, 203c are configured to receive optical alert message(s) at respective optical receivers 244b, 244c, convert the received optical alert message(s) to corresponding electrical alert message(s) and to transmit corresponding optical alert message(s) via respective LEDs 240b, 240c. Fourth network adapter 202d includes an optical receiver 244d configured to receive an optical alert message, to convert the received optical alert message to an electrical alert message and to transmit the electrical alert message to the system management device 210 via communication link 205d.

FIG. 3 illustrates a top view of another example network adapter optical alert system 300 consistent with one embodiment of the present disclosure. Example network adapter optical alert system 300 includes a plurality of network adapters 302a, 302b, . . . , 302m mounted in a rack 303 and a receiver device 306 included in the rack (e.g., in a chassis attached to and/or mounted in the rack). The rack 303 may include one or more host device(s) that may or may not be configured as blade(s) (not shown). Each network adapter 302a, 302b, . . . , 302m includes a respective LED 340a, 340b, . . . , 340m. The receiver device 306 includes a plurality of optical receivers 360a, 360b, . . . , 360m. The optical receivers 360a, 360b, . . . , 360m correspond to optical receiver 160 of FIG. 1. Each optical receiver 360a, 360b, . . . , 360m may be configured to receive optical alert message(s) from one or more of network adapter(s) 302a, 302b, . . . , 302m via respective optical communication paths 304a, 304b, . . . , 304m. Thus, optical communication paths 304a, 304b, . . . , 304m may correspond to air and a respective acceptance angle 361a, 361b, . . . , 361m and associated acceptance cone of each optical receiver 360a, 360b, . . . , 360m is within an emission volume 341a, 341b, . . . , 341m of one or more LED(s) 340a, 340b, . . . , 340m. The receiver device 306 is configured to receive one or more optical alert(s) from network adapter(s) 302a, 302b, . . . , 302m, convert the optical alert(s) to corresponding electrical alert(s) and provide the electrical alert(s) to system management device 310 via link 305.

FIG. 4 illustrates another example network adapter optical alert system 400. Example network adapter optical alert system 400 includes a plurality of network adapters 402a, 402b, . . . , 402m and a receiver device 406. The receiver device 406 includes an optical receiver 444 and is coupled to system management device 410 by communication link 405. Each network adapter 402a, 402b, . . . , 402m includes a respective LED 440a, 440b, . . . , 440m. Example network adapter alert system 400 includes a plurality of optical fibers 404a, 404b, . . . , 404m. Each optical fiber 404a, 404b, . . . , 404m corresponds to optical communication path 104 of FIG. 1. A first end and/or a second end of each optical fiber 404a, 404b, . . . , 404m may be formed as a lens. The lens(es) are configured to facilitate capture of each optical alert message by the optical fiber(s) 404a, 404b, . . . , 404m and/or the optical receiver 444. For example, the lens(es) may be configured to increase a number of light rays (i.e., a portion of an emission energy and/or emission volume) that are included in an acceptance angle of optical fiber(s) 404a, 404b, . . . , 404m and/or an acceptance angle 445 of optical receiver 444. In an embodiment each optical fiber 404a, 404b, . . . , 404m may be included in a respective communication cable configured to couple the network adapters 402a, 402b, . . . , 402m to a network, e.g., network 108.

Thus, a network adapter that may have lost connectivity with a system management device (i.e., that has a non-operational communication link) may communicate alert(s) using LED(s) present on the network adapter.

Figures 5, 6:
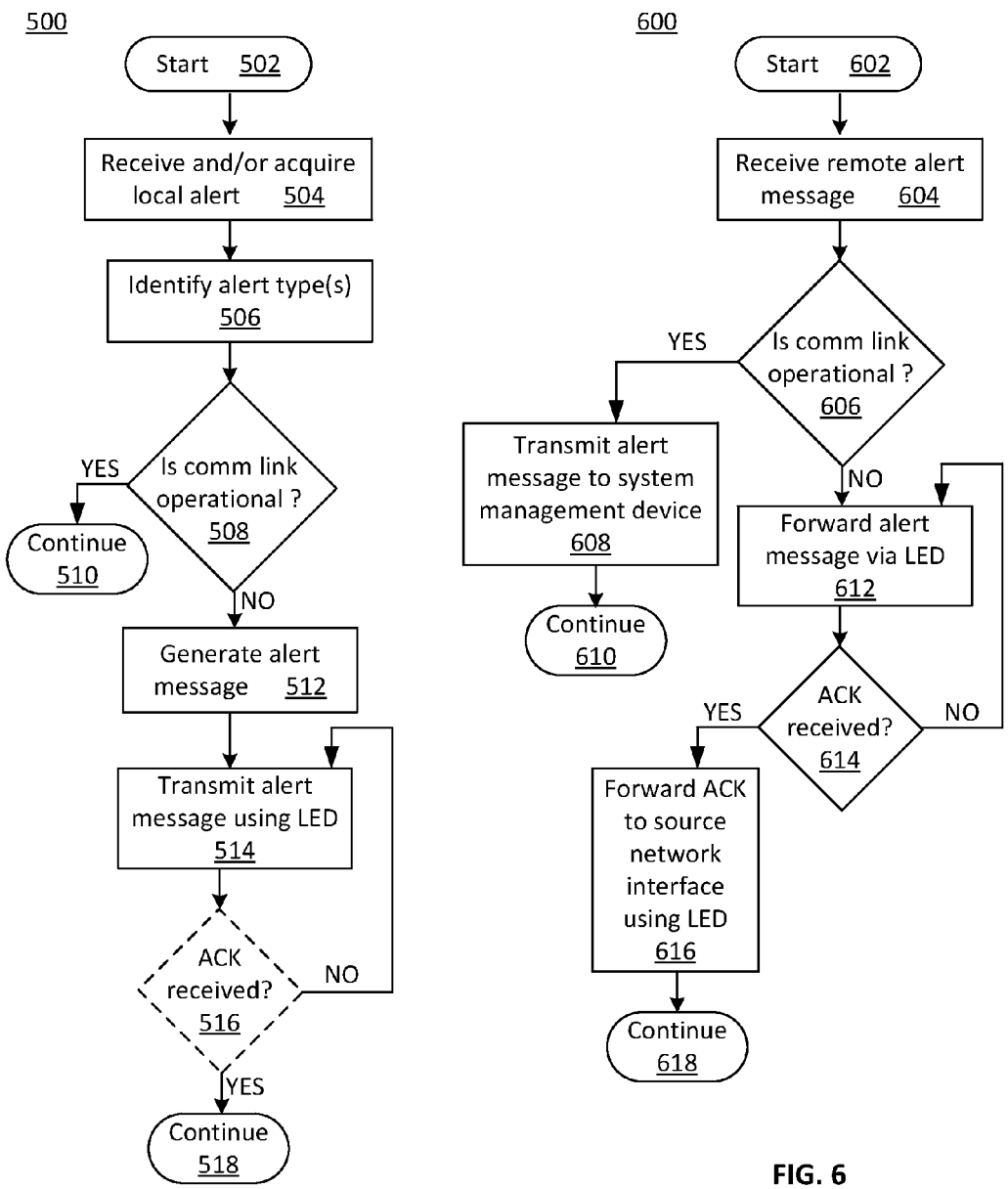
FIG. 5 is a flowchart of network adapter optical alert operations according to various embodiments of the present disclosure.
FIG. 6 is a flowchart of a receiver device and/or communication path operations according to various embodiments of the present disclosure.

FIG. 5 is a flowchart 500 of network adapter optical alert operations according to various embodiments of the present disclosure. In particular, the flowchart 500 illustrates receiving and/or acquiring a local alert and transmitting an optical alert message if an associated link is not operational. The operations may be performed, for example, by network adapter 102 of FIG. 1.

Operations of this embodiment may begin with start 502. Operations 504 may include receiving and/or acquiring a local alert. For example, the local alert may be received from BMC 122 and/or NC-SI logic 156 of FIG. 1. In another example, the local alert may be acquired by status logic 152 and may be related to operation of network adapter 102 and/or link 105. Alert type(s) may be identified at operation 506. In some embodiments, whether an associated communication link is operational may be determined at operation 508. If the link is operational, program flow may continue at operation 510. If the link is not operational, an alert message may be generated at operation 512. The alert message may include a network adapter identifier and one or more alert type identifier(s). In some embodiments, the alert message may be configured to correspond to a communications protocol, e.g., TCP/IP. In these embodiments, the alert message may include, for example, a header and a payload. The header may include routing information and the payload may include the network adapter identifier and the alert type identifier(s). The alert message may be transmitted using an LED at operation 514. Whether an ACK has been received may be determined at operation 516. If an ACK has not been received, program flow may return to operation 514 and the alert message may be resent. If an ACK has been received, program flow may continue at operation 518.

Thus, a local alert may be received and/or acquired. The local alert may be related to an operational state of, for example, a host device and/or an associated network adapter. An alert message may be generated and a corresponding optical alert message may be transmitted using an LED included in the network adapter. Thus, an alert message may be provided to a system management device via an optical communication path.

FIG. 6 is a flowchart 600 of receiver device and/or communication path operations according to various embodiments of the present disclosure. The operations may be performed, for example, by optical communication path 104 and/or receiver device 106 of FIG. 1.

Operations of this embodiment may begin at start 602. Operation 604 includes receiving a remote alert message. For example, the remote alert message may be received from a network adapter that does not have an operational communication link to a system management device, e.g., system management device 110. The network adapter may correspond to a source network adapter, e.g., network adapter 102, or the network adapter may be included in an optical communication path configured to couple the source network adapter to a receiver device. Whether a communication link is operational may be determined at operation 606. If the communication link is operational, an alert message related to the received remote alert message may be transmitted to a system management device at operation 608. Program flow may then continue at operation 610.

If the communication link is not operational, an optical alert message related to the received remote alert message may be forwarded via LED at operation 612. In some embodiments, whether an ACK has been received may be determined at operation 614. If an ACK has not been received, program flow may return to operation 612 and the optical alert message may be re-sent. If an ACK has been received, the ACK may be forwarded to the source network adapter using an LED. Program flow may then continue at operation 618.

Thus, an alert message may be received and/or forwarded by element(s) of an optical communication path and/or a receiver device. The optical communication path and/or receiver device may include a network adapter as described herein.

While the flowcharts of FIGS. 5 and 6 illustrate operations according various embodiments, it is to be understood that not all of the operations depicted in FIGS. 5 and 6 are necessary for other embodiments. In addition, it is fully contemplated herein that in other embodiments of the present disclosure, the operations depicted in FIGS. 5 and/or 6, and/or other operations described herein may be combined in a manner not specifically shown in any of the drawings, and such embodiments may include less or more operations than are illustrated in FIGS. 5 and/or 6. Thus, claims directed to features and/or operations that are not exactly shown in one drawing are deemed within the scope and content of the present disclosure.

Returning to FIG. 1, memory 124 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The BMC 122 and NC-SI logic 156 may be configured to communicate to enable platform management, including OOB remote manageability. In one embodiment, BMC 122 and/or NC-SI logic 156 may be configured to comply or be compatible with a platform management interface specification. For example, the platform management interface specification may comply or be compatible with the Intelligent Platform Management Interface Specification, Second Generation, version 2.0, revision 1.0, published February 2004, later versions and/or revisions of this specification, e.g., version 2.0, revision 1.1 released October 2013, and/or related specification(s). In another embodiment, BMC 122 and/or NC-SI logic 156 may be configured to comply or be compatible with a network controller sideband interface specification. For example, the network controller sideband interface specification may comply or be compatible with the Network Controller Sideband Interface (NC-SI) Specification, version 1.0.0, published July 2009, by the Distributed Management Task Force, Inc. (DTMF), and/or later versions of this specification, e.g., version 1.0.1, published January 2013.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

The network adapter 102, optical communication path 104, receiver device 106 and/or system management device 110 may communicate with each other using a communications protocol, for example, an Ethernet communications protocol. The Ethernet communications protocol may be capable of providing communication using a Transmission Control Protocol/Internet Protocol (TCP/IP) and/or a User Datagram Protocol (UDP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. Of course, in other embodiments, the communications protocol may include a custom and/or proprietary communications protocol.

Alternatively or additionally, network adapter 102 may be capable of communicating with optical communication path 104 and/or receiver device 106 using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network adapter 102 may be capable of communicating with optical communication path 104 and/or receiver device 106, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

Physical network 108 may include any packet-switched network such as, for example, Ethernet networks as set forth in the IEEE 802.3 standard and/or a wireless local area network such as, for example, IEEE 802.11 standard. The wireless protocol may comply or be compatible with the Wireless standard published by the IEEE titled "802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications", published April 2012, and/or later versions of this standard.

Thus, consistent with the teachings of the present disclosure, a system and method are configured to communicate fault-related alerts using one or more LED(s) present on network adapters. The methods and systems are configured to facilitate transmission of one or more alert(s) from a network adapter that has received and/or acquired the alert(s) to a system management device via an optical communication path if a communication link, e.g., Ethernet connection, is not operational. The optical communication path is configured to couple the network adapter to a receiver device that has an operational communication link to the system management device.

EXAMPLES

Examples of the present disclosure include subject material such as a method, means for performing acts of the method, a device, or of an apparatus or system related to a network adapter optical alert, as discussed below.

Example 1

According to this example there is provided a network adapter. The network adapter includes a network adapter controller. The network adapter further includes optical communication logic to at least one of receive and/or acquire a local alert and generate a local alert message related to the local alert. The network adapter further includes a first light emitting diode (LED) to convert the local alert message to a corresponding optical local alert message and to transmit the optical local alert message to an optical communication path.

Example 2

This example includes the elements of example 1, and further includes an optical receiver to receive at least one of an optical acknowledgement (ACK) and an optical remote alert message.

Example 3

This example includes the elements of example 1, further including status logic to monitor a physical state of the network adapter.

Example 4

This example includes the elements of example 1, further including Network Controller Sideband Interface (NC-SI) logic to receive a physical state parameter related to a host device.

Example 5

This example includes the elements of example 1, further including a backup power source to provide power to the network adapter if a system power source fails.

Example 6

This example includes the elements of example 3, wherein the status logic is to determine whether an associated communication link is operational.

Example 7

This example includes the elements according to any one of examples 1 through 6, wherein the local alert corresponds to at least one of a physical state parameter related to a host device and a status related to operation of the network adapter.

Example 8

This example includes the elements of example 7, wherein the physical state parameter is selected from the group including temperature, humidity, power-supply voltage, power loss, fan speed, thermal event, fan failure, communications link failure, operating system (OS) function, timeout event and system physical security.

Example 9

This example includes the elements according to any one of examples 1 through 6, wherein the optical local alert message corresponds to a Transmission Control Protocol/Internet Protocol (TCP/IP), User Datagram Protocol (UDP) or a user-defined protocol.

Example 10

This example includes the elements of example 2, wherein the optical receiver corresponds to at least one of a photosensor, photodetector, photoconductor and a photodiode Example 11

This example includes the elements of example 2, wherein the optical receiver corresponds to the first LED.

Example 12

This example includes the elements of example 2, wherein the optical receiver corresponds to a second LED.

Example 13

This example includes the elements according to any one of examples 1 through 6, wherein the network adapter controller includes the optical communication logic.

Example 14

This example includes the elements of example 2, wherein the optical communication logic is further to decode the remote alert message.

Example 15

This example includes the elements according to any one of examples 1 through 6, wherein the network adapter ID corresponds to at least one of a MAC address and an Internet Protocol (IP) address associated with the network adapter.

Example 16

This example includes the elements according to any one of examples 1 through 6, wherein the network adapter ID is related to a physical location of the network adapter.

Example 17

According to this example there is provided a method. The method includes at least one of receiving and/or acquiring, by a first network adapter, a local alert. The first network adapter includes a first light emitting diode (LED). The method further includes generating, by the first network adapter, a local alert message related to the local alert, the local alert message comprising an alert identifier (ID) and a network adapter ID. The method further includes converting, by the first LED, the local alert message to a corresponding optical local alert message and transmitting, by the first LED, the optical local alert message to an optical communication path.

Example 18

This example includes the elements of example 17, and further includes coupling by the optical communication path, the first network adapter and a receiver device, receiving, by the receiver device, the optical local alert message and transmitting, by the receiver device, an electrical alert message related to the optical local alert message to a system management device via a network.

Example 19

This example includes the elements of example 17, further including receiving, by an optical receiver, at least one of an optical acknowledgement (ACK) and an optical remote alert message.

Example 20

This example includes the elements of example 17, further including monitoring, by status logic, a physical state of the first network adapter.

Example 21

This example includes the elements of example 17, further including receiving, by the first network adapter, a physical state parameter related to a host device.

Example 22

This example includes the elements of example 17, further including providing, by a backup power source, power to the first network adapter if a system power source fails.

Example 23

This example includes the elements of example 17, further including determining, by the first network adapter, whether an associated communication link is operational.

Example 24

This example includes the elements of example 17, wherein the local alert corresponds to at least one of a physical state parameter related to a host device and a status related to operation of the first network adapter.

Example 25

This example includes the elements of example 24, wherein the physical state parameter is selected from the group including temperature, humidity, power-supply voltage, power loss, fan speed, thermal event, fan failure, communications link failure, operating system (OS) function, timeout event and system physical security.

Example 26

This example includes the elements of example 17, wherein the optical local alert message corresponds to a Transmission Control Protocol/Internet Protocol (TCP/IP), User Datagram Protocol (UDP) or a user-defined protocol.

Example 27

This example includes the elements of example 19, wherein the optical receiver corresponds to at least one of a photosensor, photodetector, photoconductor and a photodiode.

Example 28

This example includes the elements of example 19, wherein the optical receiver corresponds to the first LED.

Example 29

This example includes the elements of example 19, wherein the optical receiver corresponds to a second LED.

Example 30

This example includes the elements of example 19, further including decoding, by the first network adapter, the remote alert message.

Example 31

This example includes the elements of example 17, wherein the network adapter ID corresponds to at least one of a MAC address and an Internet Protocol (IP) address associated with the first network adapter.

Example 32

This example includes the elements of example 17, wherein the network adapter ID is related to a physical location of the first network adapter.

Example 33

This example includes the elements of example 17, wherein the optical communication path includes a second network adapter.

Example 34

This example includes the elements of example 17, wherein the optical communication path includes an optical fiber.

Example 35

This example includes the elements of example 18, wherein the receiver device corresponds to a second network adapter.

Example 36

This example includes the elements of example 17, wherein the optical communication path includes a plurality of other network adapters.

Example 37

This example includes the elements of example 18, further including, receiving, by the receiver device, a respective optical alert message from one or more of a plurality of other network adapters.

Example 38

This example includes the elements of example 38, further including coupling, by a respective other optical communication path, each other network adapter to the receiver device.

Example 39

This example includes the elements of example 39, wherein each other optical communication path corresponds to a respective optical fiber.

Example 40

This example includes the elements of example 39, wherein each other optical communication path corresponds to air.

Example 41

This example includes the elements of example 39, wherein the plurality of other network adapters is included in a rack and the receiver device is included in the rack.

Example 42

According to this example there is provided a system. The system includes a first network adapter that includes, a network adapter controller, a medium access controller (MAC) and a physical layer (PHY) including at least one port, optical communication logic to at least one of receive and/or acquire a local alert and generate a local alert message related to the local alert, the local alert message including an alert identifier (ID) and a network adapter ID, and a first light emitting diode (LED) to convert the local alert message to a corresponding optical local alert message. The system further includes a receiver device, an optical communication path to couple the first network adapter and the receiver device, the first LED is to transmit the optical local alert message to the optical communication path. The receiver device is to receive the optical local alert message and to transmit an electrical alert message related to the optical local alert message to a system management device via a network.

Example 43

This example includes the elements of example 42, wherein the first network adapter further includes an optical receiver to receive at least one of an optical acknowledgement (ACK) and an optical remote alert message.

Example 44

This example includes the elements of example 42, wherein the first network adapter further includes status logic to monitor a physical state of the first network adapter.

Example 45

This example includes the elements of example 42, wherein the first network adapter further includes Network Controller Sideband Interface (NC-SI) logic to receive a physical state parameter related to a host device.

Example 46

This example includes the elements of example 42, wherein the first network adapter further includes a backup power source to provide power to the network adapter if a system power source fails.

Example 47

This example includes the elements of example 44, wherein the status logic is to determine whether an associated communication link is operational.

Example 48

This example includes the elements according to any one of examples 42 through 47, wherein the local alert corresponds to at least one of a physical state parameter related to a host device and a status related to operation of the first network adapter.

Example 49

This example includes the elements of example 48, wherein the physical state parameter is selected from the group including temperature, humidity, power-supply voltage, power loss, fan speed, thermal event, fan failure, communications link failure, operating system (OS) function, timeout event and system physical security.

Example 50

This example includes the elements according to any one of examples 42 through 47, wherein the optical local alert message corresponds to a Transmission Control Protocol/Internet Protocol (TCP/IP), User Datagram Protocol (UDP) or a user-defined protocol.

Example 51

This example includes the elements of example 43, wherein the optical receiver corresponds to at least one of a photosensor, photodetector, photoconductor and a photodiode.

Example 52

This example includes the elements of example 43, wherein the optical receiver corresponds to the first LED.

Example 53

This example includes the elements example 43, wherein the optical receiver corresponds to a second LED.

Example 54

This example includes the elements according to any one of examples 42 through 47, wherein the network adapter controller includes the optical communication logic.

Example 55

This example includes the elements of example 43, wherein the optical communication logic is further to decode the remote alert message.

Example 56

This example includes the elements according to any one of examples 42 through 47, wherein the network adapter ID corresponds to at least one of a MAC address and an Internet Protocol (IP) address associated with the first network adapter.

Example 57

This example includes the elements according to any one of examples 42 through 47, wherein the network adapter ID is related to a physical location of the network adapter.

Example 58

This example includes the elements according to any one of examples 42 through 47, wherein the optical communication path includes a second network adapter.

Example 59

This example includes the elements according to any one of examples 42 through 47, wherein the optical communication path includes an optical fiber.

Example 60

This example includes the elements according to any one of examples 42 through 47, wherein the receiver device corresponds to a second network adapter.

Example 61

This example includes the elements according to any one of examples 42 through 47, wherein the optical communication path includes a plurality of other network adapters.

Example 62

This example includes the elements according to any one of examples 42 through 47, wherein the receiver device is further to receive a respective optical alert message from one or more of a plurality of other network adapters.

Example 63

This example includes the elements of example 62, wherein each other network adapter is coupled to the receiver device by a respective other optical communication path.

Example 64

This example includes the elements of example 63, wherein each other optical communication path corresponds to a respective optical fiber.

Example 65

This example includes the elements of example 63, wherein each other optical communication path corresponds to air.

Example 66

This example includes the elements of example 63, wherein the plurality of other network adapters is included in a rack and the receiver device is included in the rack.

Example 67

According to this example there is a computer readable storage device having stored thereon instructions that when executed by one or more processors result in the following operations including, the method according to any one of claims 17 to 41.

Example 68

Another example of the present disclosure is a system including at least one device arranged to perform the method of any one of claims 17 to 41.

Example 69

Another example of the present disclosure is a device including means to perform the method of any one of examples 17 to 41.

Example 70

This example includes the elements of example 1, wherein the local alert message including an alert identifier (ID) and a network adapter ID.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network adapter comprising:
    a media access controller (MAC) and physical layer (PHY) circuitry comprising one or more ports, the MAC and PHY circuitry configured to establish a communications link with a network;
    status logic configured to determine whether at least one of the MAC, the PHY circuitry, or the communications link is not operational;
    optical communication logic to at least one of receive and/or acquire a local alert and generate a local alert message related to the local alert; and
    at least one light emitting diode (LED) to convert the local alert message to a corresponding optical local alert message and to transmit the optical local alert message to an optical communication path;
    wherein the status logic is configured to provide said local alert to the optical communication logic when it determines that at least one of the MAC, the PHY circuitry, or the communications link is not operational.

2. The network adapter of claim 1, further comprising an optical receiver to receive at least one of an optical acknowledgement (ACK) and an optical remote alert message.

3. The network adapter of claim 2, wherein the optical receiver corresponds to at least one of a photosensor, photodetector, photoconductor and a photodiode.

4. The network adapter of claim 2, wherein the optical receiver is an LED.

5. The network adapter of claim 1, further comprising a backup power source to provide power to the network adapter if a system power source fails.

6. The network adapter of claim 1, wherein the communications link is an Ethernet link.

7. The network adapter of claim 1, wherein the optical local alert message corresponds to a Transmission Control Protocol/Internet Protocol (TCP/IP), User Datagram Protocol (UDP) or a user-defined protocol.

8. The network adapter of claim 1, wherein the local alert message comprising an alert identifier (ID) and a network adapter ID.

9. A method comprising:
    with status logic of a first network adaptor comprising a media access controller (MAC), physical layer (PHY) circuitry comprising one or more ports, and a first light emitting diode (LED), the MAC and PHY circuitry configured to establish a communications link with a network, determining an operational status of at least one of the MAC, the PHY circuitry, or the communications link;
    generating, with said status logic, a local alert when said determining indicates that at least one said MAC, said PHy circuitry, or said communications link is not operational;
    providing said local alert to optical communications logic of said first network adaptor;
    generating, with said optical communication logic a local alert message related to the local alert;
    converting, by the first LED, the local alert message to a corresponding optical local alert message; and
    transmitting, by the first LED, the optical local alert message to an optical communication path.

10. The method of claim 9, further comprising:
    receiving, with a receiver device, the optical local alert message via the optical communication path;
    transmitting, by the receiver device, an electrical alert message related to the optical local alert message to a system management device via a network.

11. The method of claim 9, further comprising receiving, by an optical receiver of the first network adaptor, at least one of an optical acknowledgement (ACK) and an optical remote alert message.

12. The method of claim 11, wherein the optical receiver corresponds to at least one of a photosensor, photodetector, photoconductor and a photodiode.

13. The method of claim 11, wherein the optical receiver corresponds to the first LED.

14. The method of claim 9, wherein the communications link is an Ethernet link.

15. The method of claim 9, wherein the optical local alert message corresponds to a Transmission Control Protocol/Internet Protocol (TCP/IP), User Datagram Protocol (UDP) or a user-defined protocol.

16. The method of claim 9, wherein the local alert message comprising an alert identifier (ID) and a network adapter ID.

17. A system comprising:
    a first network adapter comprising:
        a network adapter controller, a medium access controller (MAC) and physical layer (PHY) circuitry comprising at least one port, the MAC and PHY circuitry configured to establish a communications link with a network;
        status logic configured to determine whether at least one of the MAC, the PHY circuitry, or the communications link is not operational;
        optical communication logic to at least one of receive and/or acquire a local alert and generate a local alert message related to the local alert; and
        a first light emitting diode (LED) to convert the local alert message to a corresponding optical local alert message; and
    a receiver device;
    wherein:
    the status logic is configured to provide said local alert to the optical communication logic when it determines that at least one of the MAC, the PHY circuitry, or the communications link is not operational;
    the first LED is configured to transmit the optical local alert message to the receiver device via an optical communication path,
    the receiver device is configured, in response to receipt of the optical local alert message, to transmit an electrical alert message related to the optical local alert message to a system management device via the network.

18. The system of claim 17, wherein the first network adapter further comprises an optical receiver to receive at least one of an optical acknowledgement (ACK) and an optical remote alert message.

19. The system of claim 17, wherein the optical communication path comprises one or more second network adapters to relay the local alert message from the first network adapter to the receiver device.

20. The system of claim 17, wherein the communications link is an Ethernet link.

21. The system of claim 17, wherein the receiver device corresponds to a second network adapter.

22. The system of claim 17, wherein the receiver device is further to receive a respective optical alert message from one or more of a plurality of other network adapters.

23. The system of example 22, wherein each other network adapter is coupled to the receiver device by a respective other optical communication path.

24. The system of claim 17, wherein the local alert message comprising an alert identifier (ID) and a network adapter ID.

* * * * *

UNITED STATES PATENT AND TRADEMARK OFFICE
CERTIFICATE OF CORRECTION

PATENT NO. : 9,537,979 B2  
APPLICATION NO. : 14/568789  
DATED : January 3, 2017  
INVENTOR(S) : Scott P. Dubal, Patrick Connor and Chris Pavles Page 1 of 1

It is certified that error appears in the above-identified patent and that said Letters Patent is hereby corrected as shown below:

In the Claims

In Column 23, Line 8, in Claim 23, delete "example 22" and insert -- claim 22 --.

Signed and Sealed this
Eleventh Day of April, 2017

Michelle K. Lee
*Director of the United States Patent and Trademark Office*